United States Patent [19]
Schenck et al.

[11] Patent Number: 6,135,230
[45] Date of Patent: Oct. 24, 2000

[54] INTERLOCK CONTROL SYSTEM FOR A WORK MACHINE

[75] Inventors: Raymond T. Schenck, Sanford; W. Chris Swick, Raleigh, both of N.C.; Steven T. Ufheil, East Peoria, Ill.; Reid W. Waitt, Willow Springs, N.C.

[73] Assignee: Caterpillar S.A.R.L., Peoria, Ill.

[21] Appl. No.: 09/168,948

[22] Filed: Oct. 9, 1998

[51] Int. Cl.[7] .......................... B60K 28/04; B60R 21/00
[52] U.S. Cl. .......................... 180/273; 180/269; 701/50
[58] Field of Search .................. 180/270, 271, 180/272, 273, 269; 701/45, 50

[56] References Cited

U.S. PATENT DOCUMENTS

| | | | |
|---|---|---|---|
| Re. 28,804 | 5/1976 | Sardo, Jr. | 180/270 |
| 3,154,167 | 10/1964 | Butler et al. | 180/270 |
| 3,215,221 | 11/1965 | Rayman | 180/270 |
| 3,250,142 | 5/1966 | Schuster et al. | 180/271 |
| 3,836,955 | 9/1974 | Cracraft et al. | 180/270 |
| 4,059,196 | 11/1977 | Uchino et al. | 180/273 |
| 4,172,980 | 10/1979 | Hsieh et al. | 180/273 |
| 4,221,277 | 9/1980 | Mastropieri | 180/273 |
| 4,385,612 | 5/1983 | Masaki et al. | 123/489 |
| 4,385,863 | 5/1983 | Minor | 414/699 |
| 4,389,154 | 6/1983 | Minor et al. | 414/699 |
| 4,392,543 | 7/1983 | Buckhouse et al. | 180/273 |
| 4,509,614 | 4/1985 | Bando et al. | 180/273 |
| 4,664,218 | 5/1987 | Graham et al. | 180/273 |
| 4,699,561 | 10/1987 | Tee | 180/273 |
| 4,843,817 | 7/1989 | Shivvers et al. | 60/487 |
| 4,844,196 | 7/1989 | Clevenger et al. | 180/273 |
| 4,856,612 | 8/1989 | Clevenger et al. | 180/273 |
| 4,871,044 | 10/1989 | Strosser et al. | 180/273 |
| 4,881,371 | 11/1989 | Haeder et al. | 60/431 |
| 4,949,805 | 8/1990 | Mather et al. | 180/333 |
| 4,955,452 | 9/1990 | Simonz | 180/271 |
| 5,046,311 | 9/1991 | Cartner | 60/468 |
| 5,174,115 | 12/1992 | Jacobson et al. | 60/484 |
| 5,203,440 | 4/1993 | Peterson et al. | 192/0.094 |
| 5,425,431 | 6/1995 | Brandt et al. | 180/273 |
| 5,577,876 | 11/1996 | Haeder et al. | 414/699 |
| 5,590,731 | 1/1997 | Jacobson | 180/53.4 |
| 5,711,391 | 1/1998 | Brandt et al. | 180/273 |

FOREIGN PATENT DOCUMENTS

| | | | |
|---|---|---|---|
| 54-31121 | 3/1979 | Japan | 180/270 |

*Primary Examiner*—Peter C. English
*Attorney, Agent, or Firm*—Blackwell Sanders Peper Martin

[57] ABSTRACT

An interlock control system for controlling certain operations of a work machine wherein such system includes a first switch coupled to an operator restraint mechanism, a second switch coupled to the operator seat, a third switch operable to control the operation of the parking brake mechanism, and an electronic controller coupled to all three switches for receiving signals therefrom, the controller outputting a signal to enable the drive mechanism and the implement control system when the controller receives signals from the first, second and third switches indicative of the fact that the operator is present in the seat, the operator restraint mechanism is positioned in its restraining position, and the parking brake switch has been actuated to release the parking brake. With the drive mechanism and implement control system enabled, a second activation of the parking brake switch will disable the drive mechanism and set the parking brake, but it will not disable the implement control system. In addition, regardless of the particular operating mode, as soon as the interlock controller senses that either the operator restraint mechanism has been moved out of its restraining position and/or the operator is no longer present in the seat, the controller will disable the drive mechanism and the implement control system, and it will apply the parking brake.

30 Claims, 3 Drawing Sheets

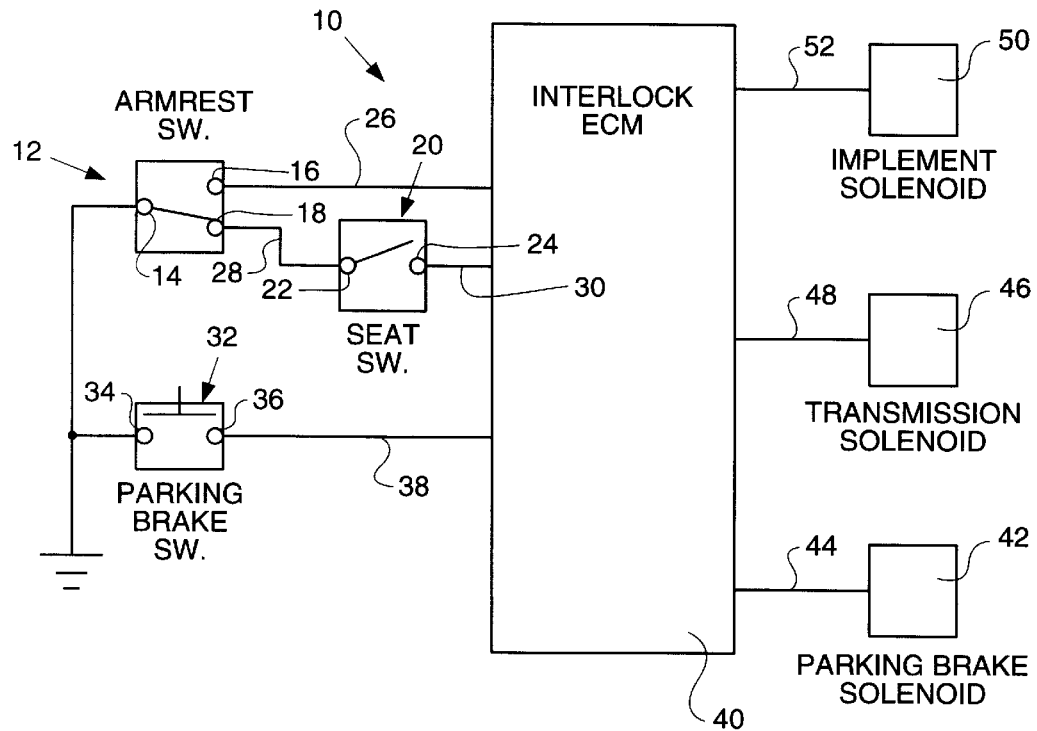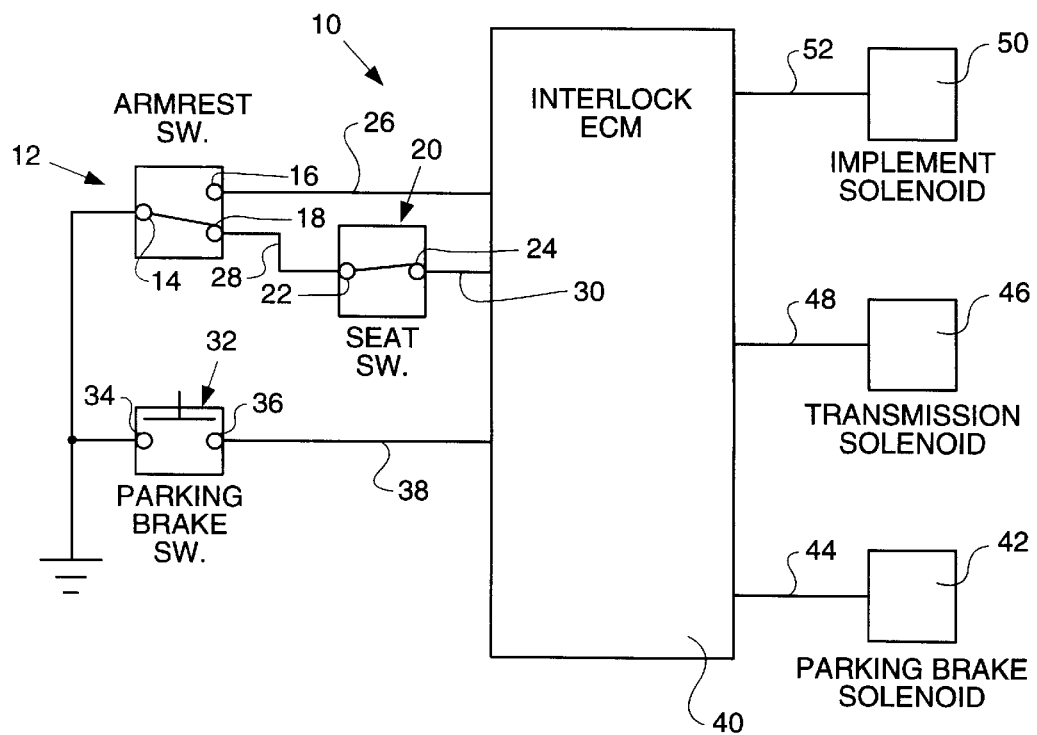

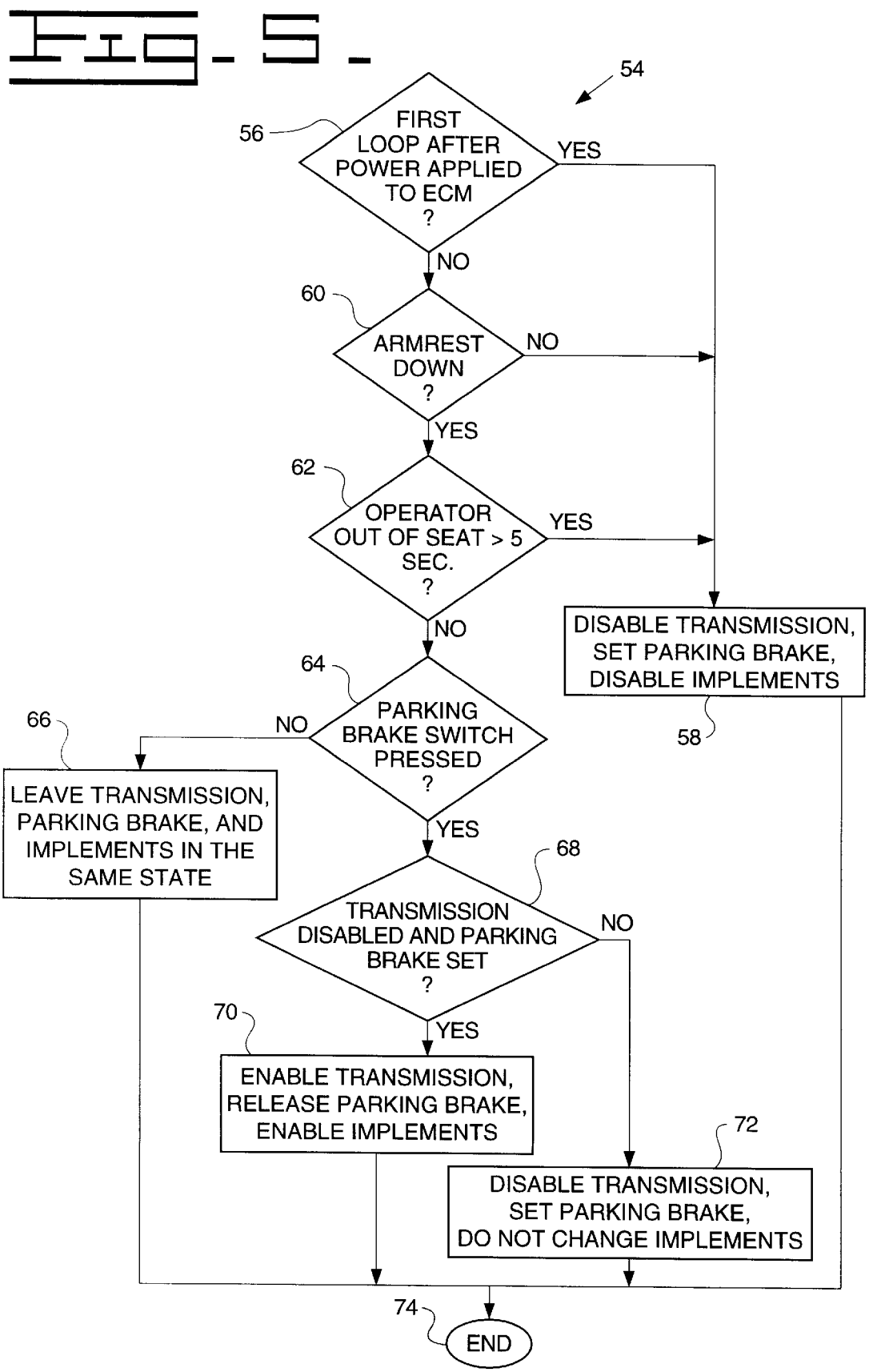

INTERLOCK CONTROL SYSTEM FOR A WORK MACHINE

TECHNICAL FIELD

This invention relates generally to interlock control systems used on work machines for controlling certain operations associated with such machines and, more particularly, to an interlock control system which incorporates activation of the parking brake switch into such system before certain operations and/or systems of the machine can be enabled during normal operation.

BACKGROUND ART

Interlock control systems are commonly used on work machines such as lawn tractors, skid steer loaders, integrated tool carriers, material handling machines, backhoe loaders and the like to prevent certain operations of the machine unless certain operator parameters are met. For example, from a safety standpoint, it is advantageous and necessary to ensure that the machine operator is properly located in the machine prior to allowing movement thereof and/or prior to enabling certain systems. In the case of certain types of work machines, such as a skid steer loader, it is advantageous and necessary to ensure that the machine operator is, in fact, seated in the operator seat and that the particular operator restraint mechanism associated with such machine is in its restraining position prior to starting the machine engine, and prior to engaging or activating the drive mechanism or drive transmission and the implement control system or lift and/or tilt mechanisms. In these types of machines, interlock control systems typically include a seat sensor and/or an operator restraint sensor to selectively lockout or enable the drive transmission and the implement lift and/or tilt mechanisms. See, for example, U.S. Pat. Nos. 4,389,154; 4,955,452; 5,425,431; and 5,711,391. In all of these known interlock systems, movement of the work machine and/or activation of some or all of the above-referenced systems are prevented unless certain operator safety parameters are met, namely, that the operator is properly seated in the operator seat and/or the operator restraint mechanism is being properly used and in its restraining position.

Although the known interlock control systems provide some measure of safety to the operation of these types of work machines, under certain operational conditions, there are situations where it is undesirable to automatically engage the drive mechanism and/or implement control system just because the operator is in the seat with the arm rest or other operator restraint mechanism in its restraining position. For example, due to the particular orientation of the work machine relative to a particular work task being accomplished, the operator may not want the drive transmission and/or implement mechanism activated as soon as the seat sensor and/or operator restraint sensor senses or indicates a proper operating condition. In addition, where both the presence of the operator in the seat and the arm rest or other operator restraint mechanism has to be in its restraining position before the drive transmission and/or implement mechanisms can be activated, latent faults in either the seat switch, the operator restraint mechanism switch, or in the sensor circuit may trigger activation of such systems when only one of the two operator parameters are fulfilled. This may cause premature movement of the work machine and/or activation of the implement lift and/or tilt mechanisms. Other work scenarios may also exist where enablement of both the drive mechanism and the implement control system, simply because the operator is present in the seat and properly restrained, may not be desirable.

It is therefore desirable to provide an additional level of safety to the known interlock control systems such that once an operator is properly located in the work machine, additional steps must be taken by the operator in order to enable the drive mechanism or drive transmission and the implement control system associated with that particular machine. Under certain conditions, it is also desirable to disable the drive mechanism or transmission and set the parking brake associated with these types of work machines without disabling the implement system.

Accordingly, the present invention is directed to overcoming one or more of the problems as set forth above and to providing an additional level of safety to known interlock systems.

DISCLOSURE OF THE INVENTION

In accordance with the teachings of the present invention, an interlock control system is disclosed wherein an operator restraint switch such as an arm rest or arm bar switch, a seat switch, and a parking brake switch are all coupled to an electronic controller in a particular manner such that switch signals inputted to the controller will control activation and/or deactivation of certain machine operations such as the drive mechanism or drive transmission and the implement lift and/or tilt mechanisms. Based upon signals inputted to the interlock electronic control module (ECM) from these switches, the interlock controller will output the appropriate control signals to the appropriate machine systems.

In a preferred embodiment, the arm rest and seat switches associated with the present system are wired or coupled in series such that the switch signals inputted to the electronic controller are tied together in a particular manner. On the other hand, the parking brake switch is independently wired or coupled to the interlock controller separate and apart from the arm rest and seat switches. Although different types of switches can be utilized with the present invention, the arm rest switch is preferably a proximity switch actuated by the lowering and raising of the arm rest; the seat switch is preferably a pressure actuated momentary switch that closes when the machine operator is seated in the seat; and the parking brake switch is a momentary switch actuated by the operator in the operator compartment.

The present interlock control system is specifically designed such that even though the interlock controller receives the appropriate input signals from the arm rest and seat switches indicating that the operator is properly positioned in the machine and that the arm rest or other operator restraint mechanism is in its operative and restraining position, the interlock controller will not enable the drive transmission and the implement control system until the parking brake switch is activated. As a result, although the present interlock system is designed to allow the operator to start the machine engine once the arm rest/seat switch criteria have been met, activation of the parking brake switch is necessary to enable the drive transmission and the implement control system. With the operator properly positioned in the operator seat and the operator restraint mechanism in its operative and restraining position, initial activation of the parking brake switch will allow the interlock controller to output signals to the appropriate solenoids to release the parking brake and enable both the drive transmission and the implement control system of the machine.

It is recognized that use of the term "implement control system" throughout this application is intended to cover all of the various implement control systems associated with the known work machines such as implement systems which include one or more lift arms as well as systems which include other articulated members. In addition, the term "implement control system" may also include either the lift mechanism or the tilt mechanism commonly associated with these types of work machines, or such term may include both such mechanisms. Still other implement control system embodiments and configurations are also anticipated and incorporated into use of the term "implement control system". Still further, it is also recognized and anticipated that other machine operations such as enablement of the auxiliary hydraulic control system can likewise be controlled by the present interlock system.

Because the present interlock controller must receive an appropriate signal from the parking brake switch in conjunction with appropriate signals from the arm rest and seat switches before enabling a particular system, activation of the parking brake switch provides an additional level of safety with respect to the overall operation of the work machine. If, after its initial activation, the parking brake switch is again activated, the interlock controller is programmed to output signals such that the drive transmission will be disabled and the parking brake will be applied. In this particular scenario, the interlock controller is further programmed not to disable the implement control system. This is advantageous because it allows the operator to lock the drive mechanism of the machine in place and secure the machine with the parking brake engaged while performing certain operations such as stump grinding and post hole digging which requires use of the implement system. Once the drive transmission system has been disabled by a further activation of the parking brake switch, the initial conditions discussed above must be present in order to re-enable such system, that is, the operator restraint mechanism must be in its restraining position, the operator must be located in the seat, and the parking brake switch must again be activated. A subsequent activation of the parking brake switch will then release the parking brake and activate or enable the drive transmission of the machine.

The present interlock system is also configured such that whenever the interlock controller senses either the arm rest or other restraint mechanism being moved out of its restraining position, and/or the seat switch opening, both the drive transmission and the implement control system will be disabled and the parking brake will be set. Here again, once disablement occurs, in order to again activate the systems, not only does the arm rest/seat switch criteria still need to be met, but the parking brake switch must again be activated before the interlock controller will again enable these systems.

The present interlock control system can be incorporated into any work machine in accordance with the teachings of the present invention.

BRIEF DESCRIPTION OF THE DRAWINGS

For a better understanding of the present invention, reference may be made to the accompanying drawings in which:

FIG. 3 is a schematic diagram of the interlock control system of FIG. 1 illustrating the condition when the arm rest is in its down position and no operator is present in the seat;

FIG. 4 is a schematic diagram of the interlock control system of FIG. 1 illustrating the condition when the arm rest is in its down position and an operator is present in the seat; and FIG. 5 is a flowchart of operating steps for the interlock control system of FIGS. 1–4 constructed in accordance with the teachings of the present invention.

BEST MODE FOR CARRYING OUT THE INVENTION

Figure 1:
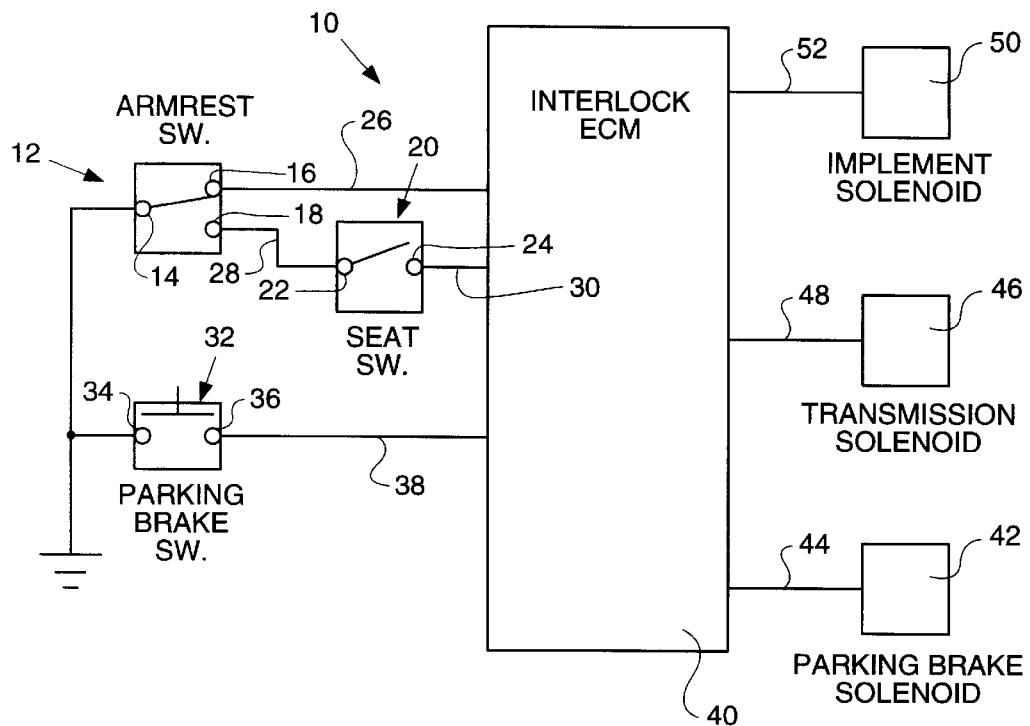
FIG. 1 is a schematic diagram of an interlock control system constructed in accordance with the teachings of the present invention.

Referring to FIG. 1, numeral 10 in FIG. 1 represents a preferred embodiment of the interlock control system of the present invention, the interlock system 10 being specifically designed to prevent movement of the work machine and the linkage associated with the implement system, unless the operator is properly seated in the operator seat, the arm rest or other operator restraint mechanism is in its operative restraining position, and the parking brake switch is actuated. The interlock control system 10 includes an arm rest switch 12, a seat switch 20, and a parking brake switch 32, all of which switches provide signal inputs to the interlock electronic control module (ECM) 40. Based upon the input signals from switches 12, 20 and 32, the interlock ECM 40 will control output signals to a parking brake pilot solenoid valve 42, a drive transmission pilot solenoid valve 46 and an implement pilot solenoid valve 50 as shown in FIGS. 1–4. These solenoid valves 42, 46 and 50 are used in a conventional manner to control the flow of hydraulic fluid to the respective systems, the transmission solenoid 46 controlling the flow of hydraulic fluid to a drive joystick or one or more drive control levers, the implement solenoid 50 controlling the flow of hydraulic fluid to an implement joystick or one or more implement control levers or foot pedals, and the parking brake solenoid 42 controlling the flow of hydraulic fluid to the parking brake. Interlock control system 10 is particularly adaptable for use in a wide variety of work machines including a skid steer loader.

As illustrated in FIG. 1, the arm rest switch 12 and the seat switch 20 are wired or coupled in series as shown such that the switch signals inputted to the ECM 40 are tied together in a particular manner. Although the particular arm rest/seat switch circuit configuration illustrated in FIG. 1 is generally preferred, it is recognized and anticipated that other circuit arrangements including wiring or coupling arm rest switch 12 and seat switch 20 to ECM 40 in a parallel arrangement will likewise work equally as well.

In the FIG. 1 embodiment, arm rest switch 12 is a non-contacting proximity switch which comprises a single pole 14, double throw reed switch having contacts 16 and 18 which are activated by a magnet (not shown). As the magnet passes in proximity to reed switch 12, the switch changes states thereby changing the signal output. In a particular work machine such as a skid steer loader, the arm rest switch 12 and its harness can be packaged and mounted to a rear mounting bracket associated with the arm rest mechanism. The magnet itself can be positioned and located on the arm rest itself such that when the arm rest is moved back and forth between its up or out-of-the-way position and its down or operative restraint position, the magnet will come in proximity to the switch 12 thereby changing the state of the switch contacts. Although the single pole, double throw reed switch illustrated in FIG. 1 is generally preferred, it is also recognized and anticipated that other types of proximity switches such as a double pole, single throw switch as well as non-proximity switches may likewise be utilized in place of switch 12 without departing from the spirit and scope of the present invention.

As shown in FIG. 1, the arm rest switch 12 is in a normally closed position against contact 16 when the arm rest is in its up position, pole 14 and contact 16 thereby providing a first set of normally closed contacts. Contact 16 is connected to ECM 40 via conductive path 26 such that ECM 40 will constantly sense and detect the arm rest up position. As shown in FIG. 1, the signal from arm rest switch 12 via conductive path 26 is closed and grounded. On the other hand, seat switch 20 is a pressure actuated momentary switch that is normally open as shown in FIG. 1 and closes when the operator is seated in the seat. In this regard, contact 18 of arm rest switch 12 is connected in series via conductive path 28 to contact 22 of seat switch 20, and contact 24 of seat switch 20 is connected directly to ECM 40 via conductive path 30. When the arm rest is moved to its down or operative restraining position, switch 12 will be moved away from its normally closed position against contact 16 as shown in FIG. 1 and into electrical contact with contact 18 as shown in FIGS. 3 and 4. In this situation, pole 14 and contact 18 provide a second set of normally open contacts. When the machine operator is seated in the seat, seat switch 20 will be moved to its closed position thereby completing the circuit via conductive paths 28 and 30 to the ECM 40 as shown in FIG. 4. When these two operator conditions or parameters are met, the signal from arm rest switch 12 via conductive path 26 to ECM 40 is open and the signal from the seat switch 20 to ECM 40 is closed. If the engine of the work machine has not been started and the arm rest/seat switch criteria as just explained has been met, interlock ECM 40 will typically be programmed to allow the operator to start the engine. On the other hand, although the interlock system 10 will allow an operator to start the engine upon satisfying the arm rest/seat criteria, activation of other systems such as the drive transmission and the implement control system are still disabled until the parking brake switch 32 is activated as will be hereinafter explained.

Figure 2:
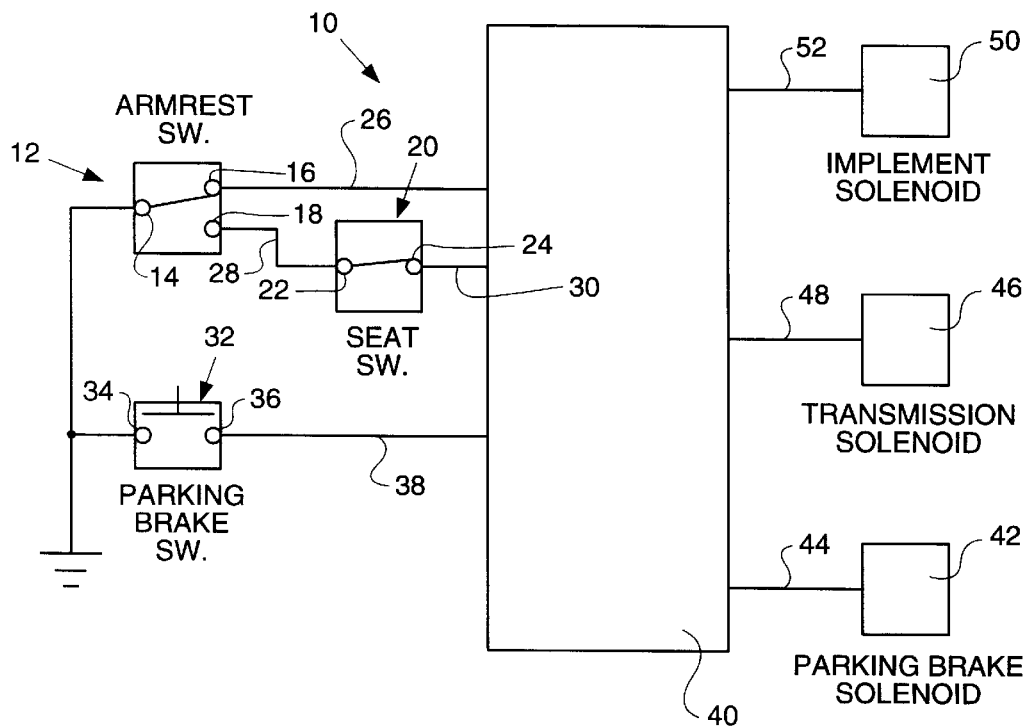
FIG. 2 is a schematic diagram of the interlock control system of FIG. 1 illustrating the condition when the arm rest is in its up position and an operator is present in the seat.

Based upon the particular arm rest/seat switch circuit configuration illustrated in FIG. 1, ECM 40 will only sense the arm rest down position when the operator is seated in the seat. ECM 40 does not sense any presence of the operator in the seat until the arm rest is moved to its down position and switch 12 is moved into electrical contact with contact 18. If the operator is seated in the seat and the arm rest remains in the up position as illustrated in FIG. 2, contact 18 will remain open and an open signal is sensed by ECM 40. As a result, with the preferred arm rest/seat switch circuit configuration illustrated in FIGS. 1–4, ECM 40 will read both states of the arm rest switch 12 and will continuously sense or detect whether the arm rest is either in or out of its up position, but will only sense or detect the arm rest in its down position when the operator is positioned in the seat. This particular arm rest/seat switch circuit configuration therefore enables ECM 40 to be coupled to switches 12 and 20 so as to be operable to receive a signal indicative of when the arm rest switch 12 is either in or out of its first state, or its non-restraining position, and a signal indicative of when the arm rest and seat switch 12 and 20 are either concurrently in their second state, or at least one of said switches is out of or is not in its second state. Although preferred, other arm rest/seat switch circuit configurations will work equally as well with the present interlock control system 10.

The parking brake switch 32 is a momentary switch actuated by the operator in the operator compartment. The parking brake switch 32 includes a pair of contacts 34 and 36, contact 34 being grounded as shown in FIG. 1 and contact 36 being independently coupled to the interlock ECM 40 via conductive path 38. Actuation of the parking brake switch 32 will input a signal to the interlock ECM 40 and, based upon such input, ECM 40 will output a signal to control operation of the parking brake solenoid valve 42. The parking brake solenoid provides hydraulic fluid flow to the parking brake for operation thereof and is coupled or connected to the interlock ECM 40 via conductive path 44.

Since the parking brake switch 32 is a momentary switch, it will remain closed against contacts 34 and 36 for as long as such switch is held by the operator in its engaged or depressed state, and switch 32 will return to its open state upon release by the operator. As a result, ECM 40 will not look at the specific state of the parking brake switch via conductive path 38, but instead, upon each activation of switch 32, ECM 40 is programmed to sense when switch 32 goes from an open state to its closed state, that is, it will sense the rising edge of the signal inputted via conductive path 38.

In the case where the parking brake being utilized is a conventional spring applied hydraulically released spline friction lock mechanism, an off signal to solenoid 42 will allow the parking brake to be set via the spring mechanism associated therewith, whereas an on signal to solenoid 42 will energize the solenoid and will allow hydraulic fluid to flow to the parking brake to exert a force in opposition to the spring mechanism and release the same. Interlock ECM 40 can therefore be programmed such that when it receives a first rising edge signal from the parking brake switch 32 via conductive path 38, ECM 40 will output a signal to solenoid 42 energizing the same and releasing the parking brake. ECM 40 will also be programmed such that when it receives a second rising edge signal from switch 32, it will output a signal to solenoid 42 de-energizing the same thereby setting or applying the parking brake. Each subsequent activation of the parking brake switch 32 will either activate or deactivate solenoid 42 as just explained. It is also recognized and anticipated that, depending upon the type of parking brake being utilized on a particular work machine, ECM 40 can be programmed to output the appropriate signals to solenoid 42 to either engage or apply the parking brake, or disengage or release the parking brake, depending upon the appropriate input signal received from the parking brake switch 32.

Electronic controllers or modules such as ECM 40 are commonly used in association with work machines for accomplishing various tasks. ECM 40 will typically include processing means, such as a microcontroller or microprocessor, associated electronic circuitry such as input/output circuitry, analog circuits or programmed logic arrays, as well as associated memory. Interlock ECM 40 can therefore be programmed to sense and recognize the appropriate signals indicative of the various conditions, states or activations of the switches 12, 20 and 32, such as the below-discussed detected conditions of such switches, and, based upon such sensed conditions, interlock ECM 40 will provide appropriate output signals to accomplish certain tasks such as controlling operation of the parking brake solenoid 42, the drive transmission solenoid 46 and the implement solenoid 50. The present interlock control system 10 would therefore operate in the following manner.

NORMAL OPERATING MODES

Power-Up Of The Work Machine

Upon initial power-up of the particular work machine, ECM 40 will disable all outputs such as outputs to the solenoids 42, 46 and 50 illustrated in FIGS. 1–4 thereby deactivating or disabling the drive transmission and implement mechanisms associated with the machine. Additionally, the parking brake switch will power-up in the off or open state position and since no hydraulics are yet applied to any system, the parking brake will be engaged. ECM 40 will therefore see the parking brake switch in its released or open state thereby indicating that the spring applied hydraulically released parking brake is set. If another type of parking brake is utilized, ECM 40 can be programmed to reset the parking brake to the set or applied condition. In addition, if any momentary switch associated with operation of the various systems associated with the particular work machine is closed at power-up, the ECM 40 must see that switch open and close again, following any predetermined debounce timing, before enabling that particular function. In this regard, ECM 40 can be programmed so as to be compatible with any particular power-up procedures associated with a particular work machine. As a result, after initial power-up of ECM 40, the drive transmission and implement systems are disabled and the parking brake is set.

Start-Up Of The Work Machine Engine

After going through standard or conventional power-up checks, ECM 40 will monitor the arm rest/seat switch inputs and, based upon such inputs, will either inhibit or allow the engine to be started. ECM 40 must see both the arm rest switch 12 and the seat switch 20 in their closed positions as illustrated in FIG. 4 before it will allow an operator to start the engine. Referring to FIG. 1, if the arm rest is in the up position and no operator is in the machine seat, conductive path 26 will be closed whereas conductive paths 28 and 30 will be open. This particular combination of signal inputs to ECM 40 from switches 12 and 20 indicate a non-operative condition and, based upon these inputs, ECM 40 would be programmed so as to inhibit the start of the engine. The opening and closing of the parking brake switch is immaterial with respect to engine start.

FIG. 2 represents the position of the switches 12 and 20 when an operator is positioned in the seat with the arm rest in its up position. In this particular situation, conductive path 26 will again be closed and, although the seat switch is in its closed position, conductive paths 28 and 30 will remain open. This particular combination of signal inputs to ECM 40 is identical to that explained above with respect to FIG. 1 and indicates a non-operative condition. Here again, ECM 40 would be programmed so as to inhibit the starting of the engine. FIG. 3 represents the position of switches 12 and 20 where the arm rest has been lowered to its down or operative position, but the operator is not seated in the seat. In this particular situation, conductive paths 26 and 30 will both be open. This particular combination of signal inputs to ECM 40 again indicates a non-operative condition and ECM 40 will be programmed as previously explained with respect to FIGS. 1 and 2 so as to inhibit the starting of the engine.

FIG. 4 represents the position of switches 12 and 20 when the operator is properly positioned in the machine seat with the arm rest in its down and operative position. In this particular situation, conductive path 26 will be open and conductive paths 28 and 30 will be closed. This particular combination of signals inputted to ECM 40 from switches 12 and 20 indicates a normal operative run condition and ECM 40 would be programmed to allow the operator to start the engine. Although the present interlock control system 10 will allow an operator to start the engine once the arm rest/seat switch criteria as explained above have been met, other systems such as the drive transmission and implement control systems are still disabled and enablement of these systems will require an additional step to be taken by the operator as will be now discussed.

Operation After Engine Start-Up

Once the engine of the particular work machine is running, activation of the parking brake switch 32 is required in order to enable both the drive transmission and the implement mechanisms associated with the particular work machine. With the parking brake set and the engine running, when ECM 40 senses a first activation of the parking brake switch 32 via conductive path 38, ECM 40 will output a signal to parking brake solenoid 42 via conductive path 44 thereby energizing solenoid 42 and releasing the parking brake. In addition, ECM 40 will also output signals to the transmission solenoid 46 via conductive path 48 and to the implement solenoid 50 via conductive path 52 thereby energizing solenoids 46 and 50 and enabling the drive transmission and implement control system of the work vehicle.

The transmission solenoid 46 is used to control and supply hydraulic fluid pressure to the drive mechanism or drive transmission such as through the use of a joystick, one or more control levers, or some other configuration. Here again, enablement of the drive mechanism or drive transmission and activation of the drive transmission solenoid 46 will only occur if ECM 40 senses (1) the operator properly positioned in the machine seat, (2) the arm rest in its down and operative restraining position, and (3) a first activation of the parking brake switch. If the operator raises the arm rest to its up or non-restraining position, or if the operator leaves the machine seat, at any time during operation of the machine, ECM 40 is programmed to de-energize solenoids 42, 46 and 50 thereby disabling the drive transmission and implement control system and setting the parking brake.

On the other hand, however, with the operator positioned in the seat, the arm rest in its down and restraining position, and the drive transmission activated, if ECM 40 senses a second activation of the parking brake switch 32, ECM 40 is programmed to again de-energize solenoids 42 and 46 and disable the drive transmission and apply the parking brake as previously explained. Importantly, this second activation of switch 32 will not disable the implement control system as will be hereinafter further discussed. Once the drive transmission system has been disabled, regardless of the method of disablement used, the initial parameters or switch conditions as illustrated in FIG. 4 must again be present in order to re-enable the drive transmission, that is, the arm rest and seat switches 12 and 20 must be closed and the parking brake switch must again be activated. Subsequent actuations of the parking brake switch 32 will produce the same sequence of events as discussed above.

In similar fashion, with the arm rest and seat switches 12 and 20 in their closed positions as illustrated in FIG. 4, upon initial activation of the parking brake switch, the implement solenoid 50 will likewise be energized thereby enabling the implement lift and/or tilt mechanisms or other implement control system. The implement solenoid 50 is likewise used to control and supply hydraulic fluid pressure to the lift and/or tilt hydraulic cylinders or other implement control mechanisms. This can be accomplished through the use of an implement joystick, one or more implement control levers, foot pedals, or some other configuration. When ECM 40 senses the above-discussed conditions, it will output a signal via conductive path 52 to solenoid 50. Here again, if either the arm rest switch 12 or the seat switch 20 moves to its opened position indicating that either the arm rest is out of its restraining position, or that the operator has left the seat, ECM 40 will de-energize implement solenoid 50 as well as solenoids 42 and 46, thereby disabling the implement control system as well as the drive transmission and again setting or applying the parking brake.

As previously explained, ECM 40 is also programmed such that a second activation of the parking brake switch 32 will not disable the implement control system. Instead, a second activation of the parking brake switch will de-energize the transmission solenoid 46 and the parking brake solenoid 42 thereby disabling the drive transmission and again setting the parking brake. This is advantageous because it allows the operator to lock and stabilize the machine in place while performing operations which require use of the implement control system such as stump grinding, post hole digging, and other similar operations. Even in this particular operating mode with the drive transmission disabled, if the operator raises the arm rest out of its restraining position or leaves the machine seat, as previously explained, ECM 40 will de-energize implement solenoid 50 and disable the implement system. Once disabled, the implement control system can be re-enabled as previously explained with respect to the drive transmission.

It should be noted that, depending upon the particular work machine, the implement control system may be disabled independent of the drive mechanism or drive transmission by using an optional implement lockout switch associated with some machines. Operation of this optional feature on some machines does not affect the operation of the interlock control system 10 disclosed herein.

Due to the fact that movement of the arm rest and seat switches 12 and 20 from a closed condition to an open condition will immediately de-energize solenoids 42, 46 and 50 and disable the drive transmission and implement systems, the input signals from switches 12 and 20, and even from the parking brake switch 32, may be conditioned for a certain period of time such that ECM 40 will debounce the particular switch input for a predetermined period of time before taking action. For example, since switches 12 and 20 must both be closed in order to provide a signal via conductive paths 28 and 30 to ECM 40, such signal may be conditioned for 150 milliseconds (ms). In other words, ECM 40 will debounce the signal input via conductive paths 28 and 30 for 150 ms before allowing any system to be enabled and/or disabled. This means that ECM 40 must first detect that both switches are closed for 150 ms before continuing. This will prevent switch contact bounce from causing inadvertent operation. Once the switches 12 and 20 are closed and debounced, ECM 40 will monitor the input for either switch opening. In this regard, the opening of either the arm rest switch 12 or the seat switch 20 can likewise be conditioned before allowing ECM 40 to control other operations. For example, the opening of seat switch 20 can be conditioned for a certain period of time, for example, 5 seconds, so as to prevent inadvertent operation resulting from the operator bouncing in the seat. ECM 40 would then debounce the opening of seat switch 20 for a 5 second period before disabling any systems. In addition, the opening of arm rest switch 12 can likewise be debounced for a certain period of time such as, for example, 150 ms, before allowing ECM 40 to disable or otherwise control various systems.

In similar fashion, the parking brake switch can likewise be debounced for a predetermined period of time such as, for example, 150 ms, before activating or deactivating certain systems. In this particular situation, ECM 40 will detect that the parking brake switch 32 is in the off or open position upon power-up of the control module 40. It will then look for the parking brake switch to close and, if the debounce time is 150 ms, the switch 32 must be closed for 150 ms before ECM 40 will recognize the input. In similar fashion, after the switch has been closed, ECM 40 can be programmed to see switch 32 open for at least 150 ms before allowing the switch to be closed again. It is recognized and anticipated that other debounce times may be used in association with switches 12, 20 and 32 depending upon the particular work machine.

In the event that the parking brake switch 32 is faulted to ground, or stuck closed, ECM 40 can be programmed to disable the drive transmission and again apply the parking brake. If this condition exists at power-up, ECM 40 can be programmed so as to not allow the parking brake to be released. In order to return to normal operation, ECM 40 must see the parking brake switch 32 open for the appropriate debounce time.

On the other hand, if the parking brake switch input via conductive path 38 is open circuited, shorted to battery, or if the parking brake switch 32 has failed to open when ECM 40 is powered-up, ECM 40 can be programmed to disable the drive transmission. If any of these faults occur during normal operation, ECM 40 will not sense any additional inputs from switch 32 and, as a result, the drive transmission will remain in the state that it was at the time of the fault. This state will remain active until the machine is powered-down or until the fault is corrected.

It is recognized and anticipated that other types of arm rest, seat and parking brake switches can be utilized in conjunction with the present invention so long as such switches are configured such that interlock ECM 40 will be able to monitor and sense when the arm rest is in its restraining position, the operator is seated in the machine seat, and the parking brake switch has been activated to either release or set the parking brake. In addition, it is also recognized and anticipated that other arm rest/seat switch circuit configurations can be utilized to allow ECM 40 to sense the proper arm rest/seat switch criteria, and it is further recognized that other types of operator restraint systems may likewise be utilized in place of the arm rest system discussed above. For example, a seat belt or shoulder harness arrangement may be used and the arm rest switch 12 illustrated in the present circuit configuration shown in FIGS. 1–4, or some other type of operator restraint switch, can be adapted for use with such other restraint by wiring or otherwise coupling such switches to ECM 40 to produce the desired result.

Regardless of the different types of switches utilized in conjunction with the present invention, and regardless of the particular type of operator restraint system incorporated into the work machine, the present interlock control system 10 adds an additional level of safety to the enablement of the drive transmission and implement systems.

Industrial Applicability

As described herein, the present interlock control system 10 has particular utility in a wide variety of work machines such as lawn tractors, skid steer loaders, integrated tool carriers, backhoe loaders, certain types of material handling machines, and other small and large equipment of this type to enable and/or disable various machine systems and functions as previously explained.

An example of operation in accordance with one aspect of the present invention is set forth in the flow chart illustrated in FIG. 5. The operating steps set forth in control loop 54 can be incorporated into the programming of the processing means of ECM 40 by techniques well known to those of ordinary skill in the art. The operating steps of flow chart 54 are initiated and operable after power has been initially applied to ECM 40 and such steps can be repeated at any predetermined rate or interval such as every 15 ms.

Once control loop 54 is initiated, ECM 40, at step 56, will determine if this particular loop is, in fact, the first control loop initiated after power-up of ECM 40. If this is the case, ECM 40 will disable the drive transmission, set the parking brake and disable the implement control system as illustrated at step 58 and this first control loop will terminate as indicated at step 74. If this loop is not the first control loop after initial power-up, ECM 40 will then check the position of the arm rest, or other operator restraint mechanism, at step 60. If the arm rest is not in its down or operative restraining position, ECM 40 will again, at step 58, disable the transmission, set the parking brake and disable the implement control system, if such systems are operational, and thereafter control loop 54 will terminate at step 74.

If ECM 40 senses that the arm rest is in its down position, it will then determine if the operator is properly positioned within the machine seat at step 62. Here again, if ECM 40 senses that the operator is out of the seat greater than a predetermined debounce time, such as 5 seconds, ECM 40 will again disable the transmission, set the parking brake and disable the implement control system at step 58, if such systems were previously operational, and control loop 54 will again end as indicated at step 74.

On the other hand, if ECM 40 determines that the operator has not been out of the seat for the appropriate debounce time, ECM 40 will then look to see if the parking brake switch has been pressed at step 64. If ECM 40 senses that the parking brake switch has not been pressed since completion of the last control loop, at step 66, ECM 40 will leave the drive transmission, parking brake and implement control system in the same state or condition as such systems were previously in prior to initiation of the current control loop and such control loop will end as indicated as step 74. However, if ECM 40, at step 64, determines that the parking brake switch has been activated since the last completion of control loop 54, it will then make a determination, at step 68, as to whether the drive transmission was previously disabled and the parking brake set.

If ECM 40, at step 68, determines that the drive transmission was previously disabled and the parking brake set, ECM 40 will output signals to solenoids 42, 46 and 50 to enable the drive transmission, release the parking brake and enable the implement control system if such system was previously disabled, as indicated at step 70, and control loop 54 would terminate as indicated at step 74. On the other hand, if ECM 40 determines, at step 68, that the drive transmission was active and the parking brake was in its released state, ECM 40 would then disable the drive transmission, set the parking brake, but ECM 40 would not change the state of the implement control system as indicated at step 72 and control loop 54 would again end at step 74. Once control loop 54 has completed a particular cycle, this process will be repeated based upon a predetermined repeat interval so that ECM 40 will constantly monitor the position and operational states of arm rest and seat switches 12 and 20 and activation of the parking brake switch 32.

It is recognized that variations to the steps depicted in flow chart 54 could be made without departing from the spirit and scope of the present invention. In particular, steps could be added or some steps could be eliminated. All such variations are intended to be covered by the present invention. It is also recognized that in most applications an interlock control system including ECM 40 will include a variety of other switches, solenoids, relays, indicators, sensors and other control apparatus.

ECM 40 is therefore operable to allow an operator to start the machine engine only after the arm rest/seat switch criteria have been met and, importantly, enablement of the drive mechanism or drive transmission and the implement control system are only possible after a still further initial activation of the parking brake switch. A second activation of the parking brake switch will disable the drive transmission and set the parking brake, but it will not disable the implement control system. In addition, regardless of the particular operating mode, as soon as interlock ECM 40 senses that either the arm rest is being moved out of its operative or restraining position and/or the seat switch is opening, ECM 40 will disable the drive transmission, the implement control system, and it will set the parking brake. Once disablement occurs, in order to again enable the drive transmission as well as the implement control system, besides meeting the arm rest/seat switch criteria discussed above, the parking brake switch must again be actuated before enablement will occur.

Other aspects, objects and advantages of the present invention can be obtained from a study of the drawings, the disclosure and the appended claims.

What is claimed is:

1. A control system for controlling certain operations of a work machine wherein the work machine includes an engine, an operator restraint mechanism, an operator seat, a parking brake mechanism, a drive transmission system and an implement control system, said control system comprising:

a first switch coupled to the operator restraint mechanism and actuatable between a first state corresponding to the condition when said operator restraint mechanism is in a non-restraining condition and a second state corresponding to the condition when said operator restraint mechanism is in a restraining condition;

a second switch coupled to the operator seat and actuatable between a first state corresponding to the condition when an operator is not present in the seat and a second state corresponding to the condition when an operator is present in the seat;

a third switch actuatable to control the operation of the parking brake mechanism between a condition wherein the parking brake mechanism is applied and a condition wherein the parking brake mechanism is released;

an electronic controller coupled to said first, second and third switches for receiving signals therefrom, said controller being operable to receive a signal indicative of when said first switch is in its first or second state, a signal indicative of when said second switch is in its first or second state, and a signal indicative of when said third switch has been actuated;

said controller outputting a signal to enable the drive transmission system when said controller receives a signal indicative of said first switch being in its second state, a signal indicative of said second switch being in its second state, and a signal indicative of said third switch being actuated to release the parking brake mechanism.

2. The control system, as set forth in claim 1, wherein said controller further outputs a signal to enable the implement control system when said controller receives a signal indicative of said first switch being in its second state, a signal indicative of said second switch being in its second state, and a signal indicative of said third switch being actuated to release the parking brake mechanism.

3. The control system, as set forth in claim 1, wherein said controller outputs a signal to disable the drive transmission system when said controller receives a subsequent signal indicative of said third switch being actuated to apply the parking brake mechanism.

4. The control system, as set forth in claim 1, wherein said controller outputs a signal to disable the drive transmission system when said controller receives a subsequent signal indicative of when said first switch is in its first state.

5. The control system, as set forth in claim 1, wherein said controller outputs a signal to disable the drive transmission system when said controller receives a subsequent signal indicative of when said second switch is in its first state.

6. The control system, as set forth in claim 2, wherein said controller outputs a signal to disable the implement control system when said controller receives a subsequent signal indicative of when said first switch is in its first state.

7. The control system, as set forth in claim 2 wherein said controller outputs a signal to disable the implement control system when said controller receives a subsequent signal indicative of when said second switch is in its first state.

8. The control system, as set forth in claim 4, wherein said controller further outputs a signal to apply the parking brake mechanism when the controller receives said subsequent signal.

9. The control system, as set forth in claim 5, wherein said controller further outputs a signal to apply the parking brake.

10. A control system for controlling certain operations of a work machine wherein the work machine includes an engine, an operator restraint mechanism, an operator seat, a parking brake mechanism, a drive transmission system and an implement control system, said control system comprising:

a first switch coupled to the operator restraint mechanism and actuatable between a first state corresponding to the condition when said operator restraint mechanism is in a non-restraining condition and a second state corresponding to the condition when said operator restraint mechanism is in a restraining condition;

a second switch coupled to the operator seat and actuatable between a first state corresponding to the condition when an operator is not present in the seat and a second state corresponding to the condition when an operator is present in the seat;

a third switch actuatable upon a first activation to allow hydraulic fluid to control the operation of the parking brake mechanism so as to release the parking brake mechanism and actuatable upon a second activation to allow hydraulic fluid to control the operation of the parking brake mechanism so as to apply the parking brake mechanism;

an electronic controller coupled to said first, second and third switches for receiving signals therefrom, said controller being operable to receive a first signal indicative of when said first switch is in its first or second state, a second signal indicative of when said second switch is in its first or second state, and a third signal indicative of when said third switch has been actuated;

said controller outputting a signal to enable the drive transmission system and the implement control system when said controller receives a signal indicative of said first switch being in its second state, a signal indicative of when said second switch is in its second state, and a signal indicative of a first activation of said third switch.

11. The control system, as set forth in claim 10, wherein said controller outputs a signal to disable the drive transmission system when said controller receives a signal indicative of a second activation of said third switch.

12. The control system, as set forth in claim 11, wherein subsequent activations of said third switch repeat the cycle of releasing and applying the parking brake mechanism, said controller outputting a signal to enable the drive transmission system when said controller receives a signal indicative of a third activation of said third switch.

13. The control system, as set forth in claim 10, wherein said controller outputs a signal to disable the drive transmission system and the implement control system when said controller receives a subsequent signal indicative of when said first switch is in its first state.

14. The control system, as set forth in claim 10, wherein said controller outputs a signal to disable the drive transmission system and the implement control system when said controller receives a subsequent signal indicative of when said second switch is in its first state.

15. A control system for controlling certain operations of a work machine wherein the work machine includes an engine, an operator restraint mechanism, an operator seat, a parking brake mechanism, a drive transmission system and an implement control system, said control system comprising:

a first switch coupled to the operator restraint mechanism and actuatable between a first state corresponding to the condition when said operator restraint mechanism is in a non-restraining condition and a second state corresponding to the condition when said operator restraint mechanism is in a restraining condition;

a second switch coupled to the operator seat and actuatable between a first state corresponding to the condition when an operator is not present in the seat and a second state corresponding to the condition when an operator is present in the seat said second switch connected in series with said first switch;

a third switch actuatable to control the operation of the parking brake mechanism so as to either apply or release the parking brake mechanism; and an electronic controller coupled to said first, second and third switches and operable to receive signals therefrom, said controller being operable to receive a signal indicative of when said first and second switches are either concurrently in their second states or at least one of said first and second switches is not in its second state;

said controller outputting a signal to enable the drive transmission system when said controller receives a signal indicative of said first and second switches being concurrently in their second state, and said controller receives a signal indicative of a first actuation of said third switch.

16. The control system, as set forth in claim 15, wherein said controller further outputs a signal to release the parking brake mechanism when said controller receives said signal indicative of a first actuation of said third switch.

17. The control system, as set forth in claim 15, wherein said controller outputs a signal to enable the implement control system when said controller receives a signal indicative of said first and second switches being concurrently in their second states, and a signal indicative of a first actuation of said third switch.

18. The control system, as set forth in claim 15, wherein said controller outputs a signal to disable the drive transmission system when said controller receives a signal indicative of a second actuation of said third switch.

19. The control system, as set forth in claim 18, wherein said controller outputs a signal to apply the parking brake mechanism when said controller receives said signal indicative of a second actuation of said third switch.

20. The control system, as set forth in claim 18, wherein said controller outputs a signal to enable the drive transmission system when said controller receives a signal indicative of a subsequent actuation of said third switch.

21. The control system, as set forth in claim 20, wherein said controller further outputs a signal to release the parking brake mechanism when said controller receives said signal indicative of a subsequent actuation of said third switch.

22. The control system, as set forth in claim 15, wherein said controller outputs a signal to disable the drive transmission system when said controller receives a signal indicative of at least one of said first and second switches not being in its second state.

23. The control system, as set forth in claim 22, wherein said controller outputs a signal to apply the parking brake mechanism when said controller receives said signal indicative of at least one of said first and second switches not being in its second state.

24. The control system, as set forth in claim 17, wherein said controller outputs a signal to disable the implement control system when said controller receives a signal indicative of at least one of said first and second switches not being in its second state.

25. The control system, as set forth in claim 24 wherein said controller outputs a signal to apply the parking brake mechanism when said controller receives said signal indicative of at least one of said first and second switches not being in its second state.

26. An interlock control system for controlling certain operations of a work machine wherein the work machine includes an engine, an arm rest mechanism operable between an up position and a down position, an operator seat, a drive mechanism for enabling the machine to move in a plurality of directions, a parking brake, and an implement control system, said interlock control system comprising:

an arm rest switch, a seat switch, and a parking brake switch;

a controller coupled to said arm rest, seat and parking brake switches to receive signals therefrom;

a parking brake solenoid coupled to said controller for controlling the operation of the parking brake between a condition wherein the parking brake is applied and a condition wherein the parking brake is released, said parking brake being released when said controller sends an on signal to said parking brake solenoid allowing hydraulic fluid to flow to the parking brake to exert a force in opposition to a set position, and said parking brake being applied when said controller sends an off signal to said parking brake solenoid allowing said parking brake to return to said set position;

a transmission solenoid coupled to said controller for controlling the operation of the drive mechanism between an enabled condition and a disabled condition; and an implement solenoid coupled to said controller for controlling the operation of the implement control system between an enabled condition and a disabled condition;

said arm rest switch being operable between a first state corresponding to said arm rest being in its up position and a second state corresponding to said arm rest being in its down position;

said seat switch being operable between a first state corresponding to no operator being present in the seat and a second state corresponding to an operator present in the seat;

said parking brake switch being operable to apply and release the parking brake;

said controller being operable to receive a signal indicative of when said arm rest switch is either in or out of its first state, a signal indicative of when said arm rest and seat switches are either concurrently in their second states or at least one of said arm rest and seat switches is out of its second state, and a signal indicative of an actuation of said parking brake switch;

said controller outputting a signal to the transmission solenoid, the implement solenoid and the parking brake solenoid to enable the drive mechanism and the implement control system and to release the parking brake when said controller receives a signal indicative of said arm rest switch being out of its first state, a signal indicative of said arm rest and seat switches being concurrently in their second states, and a signal indicative of a first activation of said parking brake switch.

27. The interlock control system, as set forth in claim 26, wherein said controller outputs a signal to the transmission solenoid and the parking brake solenoid to disable the drive mechanism and apply the parking brake when said controller receives a signal indicative of a second activation of said parking brake switch.

28. The interlock control system, as set forth in claim 27, wherein said controller outputs a signal to the transmission solenoid and the parking brake solenoid to enable the drive mechanism and to release the parking brake when said controller receives a signal indicative of a subsequent activation of said parking brake switch.

29. The interlock control system, as set forth in claim 26, wherein said controller outputs a signal to the transmission solenoid, the implement solenoid and the parking brake solenoid to disable the drive mechanism and the implement control system and to apply the parking brake when said controller receives a signal indicative of at least one of said arm rest and seat switches being out of its second state.

30. The interlock control system, as set forth in claim 26, wherein said controller outputs a signal to the transmission solenoid, the implement solenoid and the parking brake solenoid to disable the drive mechanism and the implement control system and to apply the parking brake when said controller receives a signal indicative of said arm rest switch being in its first state.

* * * * *